United States Patent
Kosaka et al.

(10) Patent No.: US 9,420,137 B2
(45) Date of Patent: Aug. 16, 2016

(54) IMAGE-READING APPARATUS, IMAGE-PROCESSING METHOD, AND COMPUTER PROGRAM PRODUCT

(71) Applicant: PFU Limited, Ishikawa (JP)

(72) Inventors: Kiyoto Kosaka, Ishikawa (JP); Kazuaki Umi, Ishikawa (JP); Hiroyuki Kameda, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 1 day.

(21) Appl. No.: 14/308,087

(22) Filed: Jun. 18, 2014

(65) Prior Publication Data
US 2015/0256697 A1    Sep. 10, 2015

(30) Foreign Application Priority Data
Mar. 6, 2014  (JP) .................... 2014-044183

(51) Int. Cl.
*H04N 1/00*    (2006.01)
*H04N 1/203*   (2006.01)

(52) U.S. Cl.
CPC ....... *H04N 1/00824* (2013.01); *H04N 1/00809* (2013.01); *H04N 1/203* (2013.01)

(58) Field of Classification Search
None
See application file for complete search history.

(56) References Cited

U.S. PATENT DOCUMENTS

| | | | | |
|---|---|---|---|---|
| 5,880,858 A | * | 3/1999 | Jin | H04N 1/00681 358/453 |
| 7,826,679 B2 | * | 11/2010 | Honda | H04N 1/00681 358/3.27 |
| RE42,234 E | * | 3/2011 | Chiu | H04N 1/00795 250/208.1 |
| 2004/0105128 A1 | * | 6/2004 | Sano | G06K 15/02 358/1.18 |
| 2013/0121595 A1 | * | 5/2013 | Kawatani | G06K 9/32 382/199 |
| 2014/0375802 A1 | * | 12/2014 | Hasegawa | G06K 9/2054 348/143 |

FOREIGN PATENT DOCUMENTS

| | | |
|---|---|---|
| JP | 2002-010059 A | 1/2002 |
| JP | 2006-339770 A | 12/2006 |
| JP | 2007-088654 A | 4/2007 |
| JP | 2008-059081 A | 3/2008 |
| JP | 2013-106160 A | 5/2013 |

OTHER PUBLICATIONS

Decision of a Patent Grant Japanese Patent Application No. 2014-044183 dated Apr. 28, 2015 with full English translation.

* cited by examiner

*Primary Examiner* — Christopher D Wait
(74) *Attorney, Agent, or Firm* — McDermott Will & Emery LLP

(57) ABSTRACT

An image-reading apparatus according to the present invention reads one or more documents to acquire a read image, detects edge coordinates of a document image closest to an outer edge of the read image in a plurality of certain directions, and regionally divides the read image in the certain directions based on any one or both of a region of the read image in which no edge coordinates are detected and the edge coordinates of an edge end of the detected document image.

10 Claims, 14 Drawing Sheets

IMAGE-READING APPARATUS, IMAGE-PROCESSING METHOD, AND COMPUTER PROGRAM PRODUCT

CROSS-REFERENCE TO RELATED APPLICATION

This application is based upon and claims the benefit of priority from Japanese Patent Application No. 2014-044183, filed Mar. 6, 2014, the entire contents of which are incorporated herein by reference.

BACKGROUND OF THE INVENTION

1. Field of the Invention

The present invention relates to an image-reading apparatus, an image-processing method, and a computer program product.

2. Description of the Related Art

Technologies have hitherto been disclosed for detecting a document position from a read image.

A known image-reading apparatus detects edges from the top and bottom and right and left of a read image and calculates linearity of the edges to determine a document position (See JP-A-2007-88654).

A known image-processing apparatus detects all edges in an image and calculates linearity from the edges to detect likelihood of a rectangle (See JP-A-2013-106160).

Another known image-processing apparatus performs horizontal and vertical scanning for the entire image and, through edge tracing or labeling, discriminates a plurality of document regions (See JP-A-2002-10059).

In the known image-processing apparatuses (e.g., JP-A-2007-88654), however, a greater reading length (image length) theoretically requires a large amount of memory, which leads to a problem of an increased amount of calculation.

SUMMARY OF THE INVENTION

It is an object of the present invention to at least partially solve the problems in the conventional technology.

An image-reading apparatus according to one aspect of the present invention includes an image acquiring unit that causes an image-reading unit to read one or more documents to acquire a read image, an edge detecting unit that detects edge coordinates of a document image closest to an outer edge of the read image in a plurality of certain directions, and a dividing unit that regionally divides the read image in the certain directions based on any one or both of a region of the read image in which no edge coordinates are detected by the edge detecting unit and the edge coordinates of an edge end of the document image detected by the edge detecting unit.

An image-processing method according to another aspect of the present invention is executed by an image-reading apparatus including an image acquiring step of causing an image-reading unit to read one or more documents to acquire a read image, an edge detecting step of detecting edge coordinates of a document image closest to an outer edge of the read image in a plurality of certain directions, and a dividing step of regionally dividing the read image in the certain directions based on any one or both of a region of the read image in which no edge coordinates are detected at the edge detecting step and the edge coordinates of an edge end of the document image detected at the edge detecting step.

A computer program product having a non-transitory computer readable medium according to still another aspect of the present invention includes programmed instructions for causing, when executed by an image-reading apparatus, the image-reading apparatus to perform an image-processing method including an image acquiring step of causing an image-reading unit to read one or more documents to acquire a read image, an edge detecting step of detecting edge coordinates of a document image closest to an outer edge of the read image in a plurality of certain directions, and a dividing step of regionally dividing the read image in the certain directions based on any one or both of a region of the read image in which no edge coordinates are detected at the edge detecting step and the edge coordinates of an edge end of the document image detected at the edge detecting step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image-reading apparatus, an image-processing method, and a computer program product according to an embodiment of the present invention will be explained in detail below with reference to the accompanying drawings. The embodiment is not intended to limit the scope of the present invention. In the embodiment, the image-reading apparatus may be explained as, for example, a document scanner device operable according to a manual feeding system (continuous document feeding mechanism (CDF) system). This is, however, not the only possible configuration. The image-reading apparatus may be a document scanner device operable according to an automatic document feeding mechanism system (ADF system), a flat-bed type document scanner device, an overhead image-reading apparatus, or the like. In particular, the image-processing method according to the embodiment is applicable to images acquired in any type of image-reading apparatus, including the document scanner device operable according to the CDF system, the document scanner device operable according to the ADF system, the flat-bed type document scanner device, and the overhead image-reading apparatus.

1. Configuration of the Embodiment

Figure 1:
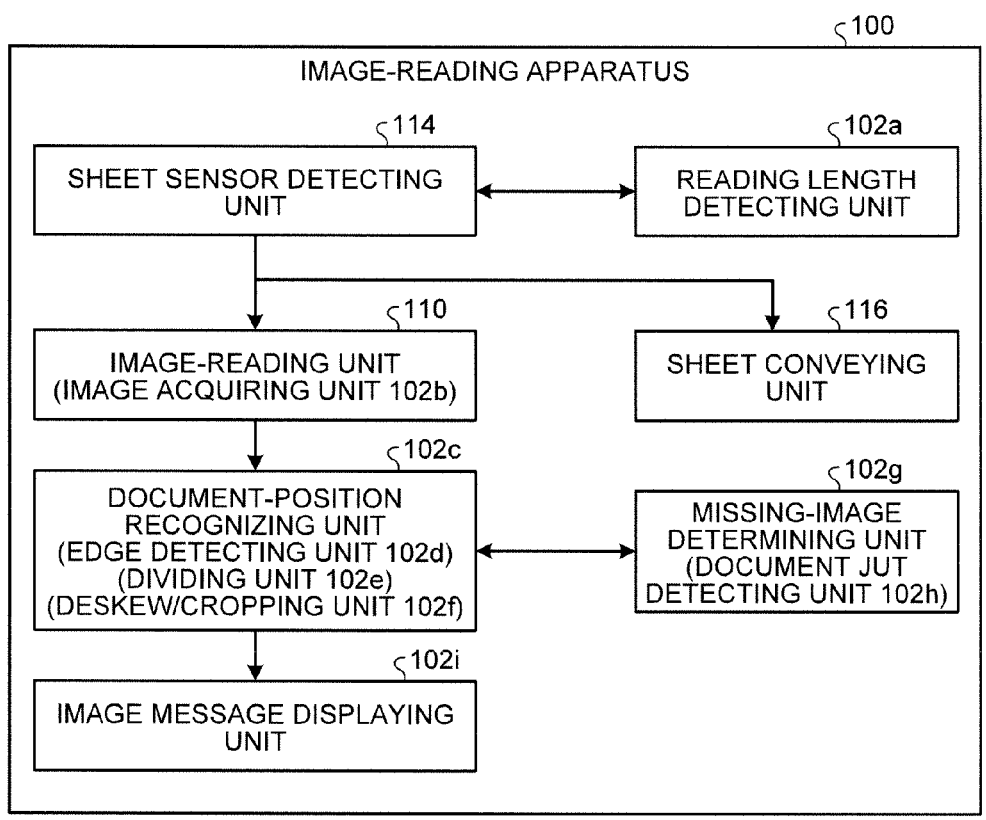
FIG. 1 is a hardware configuration diagram of an exemplary image-reading apparatus.

An exemplary configuration of an image-reading apparatus 100 according to the embodiment of the present invention will be explained below with reference to FIG. 1. Processing and other matters according to the embodiment will thereafter be explained in detail. FIG. 1 is a hardware configuration diagram of the exemplary configuration of the image-reading apparatus 100.

As shown in FIG. 1, the image-reading apparatus 100 generally includes an image-reading unit 110 such as a camera, a sheet sensor detecting unit 114, a sheet conveying unit 116, and a control unit 102 (a reading length detecting unit 102a, an image acquiring unit 102b, a document-position recognizing unit 102c, a missing-image determining unit 102g, and an image message displaying unit 102i). Although omitted in FIG. 1, the image-reading apparatus 100 according to the embodiment may further include a storage unit 106 including a memory, an input/output unit (I/O unit) 112, and the like. The image-reading apparatus 100 may still include an entire-surface conveying roller. These units are connected communicably to each other via a communication path of any desirable type. The control unit 102 may control the image-reading unit 110, the input/output unit (I/O unit) 112, the sheet sensor detecting unit 114, and the sheet conveying unit 116.

The storage unit 106 stores various types of databases, tables, files, and the like. The storage unit 106 serves as a storage and, for example, a memory such as a RAM and a ROM, a fixed disk drive such as a hard disk, a flexible disk, and an optical disc may be used for the storage unit 106. The storage unit 106 stores a computer program and the like that gives instructions to a central processing unit (CPU) to perform various types of processing. The storage unit 106 may store images such as a read image, a divided region of a read image, a document image, or an end region of a read image.

The image-reading unit 110 scans a document and reads an image of the document. The image-reading unit 110 may scan one or more documents to read images of the documents. Alternatively, the image-reading unit 110 may simultaneously scan a plurality of documents to read images of the documents. The image-reading unit 110 may start reading the image at the same time as start of sheet conveyance to a conveying path. The image-reading unit 110 according to the embodiment may include an image sensor such as a contact image sensor (CIS). The image-reading unit 110 may include a light source such as an RGB three-color LED. The image sensor may convert signals from linearly arrayed light-receiving elements to serial output signals. This causes a linear image to be output for each line, and the control unit 102 combines these linear images to generate a two-dimensional image.

The input/output unit 112 inputs and outputs data. The input/output unit 112 may be a key input unit, a touch panel, a control pad (e.g., a touch pad and a game pad), a mouse, a keyboard, a microphone, and the like. The input/output unit 112 may be a display unit that displays a display screen of an application or the like (e.g., a display, monitor, and touch panel of a liquid crystal or an organic EL). The input/output unit 112 may be a sound output unit that outputs sound information as sound (e.g., a speaker).

The sheet sensor detecting unit 114 detects a reading state of a sheet (document). The sheet sensor detecting unit 114 detects that the sheet (document) is at a conveying inlet or on the conveying path. The sheet sensor detecting unit 114 detects that the sheet (document) is inserted in the conveying inlet. The sheet sensor detecting unit 114 may determine the reading state of the sheet (document) at the image-reading unit 110. The sheet sensor detecting unit 114 may be an entire-surface sheet detecting sensor, or the like.

The sheet conveying unit 116 conveys the sheet (document) onto the conveying path. The sheet conveying unit 116 may start the sheet conveyance when the sheet sensor detecting unit 114 detects that the sheet (document) has been inserted in the conveying inlet.

The control unit 102 includes a CPU that integrally controls the image-reading apparatus 100. The control unit 102 includes an internal memory that stores a control program, a computer program that specifies various processing procedures, and required data. Based on these computer programs, the control unit 102 performs information processing for performing various processes.

The control unit 102 generally includes the reading length detecting unit 102a, the image acquiring unit 102b, the document-position recognizing unit 102c, the missing-image determining unit 102g, and the image message displaying unit 102i.

The reading length detecting unit 102a detects a length of reading, that is, a reading length (an image length) based on the reading state of the sheet (document) detected by the sheet sensor detecting unit 114 (a sheet sensor detecting state). When the reading length is limited, the maximum value of a readable length (maximum reading length) may be any value compatible with the capacity of the memory (the storage unit 106).

The image acquiring unit 102b causes the image-reading unit 110 to read a document to acquire an image. The image acquiring unit 102b may cause the image-reading unit 110 to read one or more documents to acquire a read image. The image acquiring unit 102b may cause the image-reading unit 110 to read a plurality of documents simultaneously to acquire a read image. Alternatively, the image acquiring unit 102b may cause the image-reading unit 110 to read one or more documents and acquire a read image when the sheet sensor detecting unit 114 detects no document at the conveying inlet. When a document image is contained in a divided region regionally divided by the document-position recognizing unit 102c, the image acquiring unit 102b may acquire a read image excluding the divided region as a new read image. Alternatively, when a document jut detecting unit 102h detects a document jut, the image acquiring unit 102b may splice an end region that contains a document image including edge coordinates on an outer edge and a read image acquired next by the image acquiring unit 102b, to acquire a new read image (image synthesis). The image acquiring unit 102b may acquire a read image having a certain reading length (e.g., the maximum reading length or a user-specified reading length) or shorter. The image acquiring unit 102b may store images read by the image-reading unit 110, for example, in the storage unit 106. That is, the image acquiring unit 102b may control the image-reading unit 110 to acquire an image. For example, the image acquiring unit 102b may control the image-reading unit 110 to combine line-by-line linear images output by the image sensor to acquire a two-dimensional image and store the two-dimensional image in the storage unit 106. The image acquiring unit 102b may perform projective transformation of the image read by the image-reading unit 110 (e.g., projective transformation into an image photographed from the front).

The document-position recognizing unit 102c recognizes a position of a document and acquires a document image. The document-position recognizing unit 102c may detect the position of a plurality of documents. The document-position recognizing unit 102c may divide a region of the read image. For example, the document-position recognizing unit 102c may use the read image to recognize the position of the document and clip a document image from the read image. When the sheet sensor detecting unit 114 detects that a sheet (a document) has been inserted in the conveying inlet, the document-position recognizing unit 102c may repeat processing to effectively recognize the position of a plurality of documents. The document-position recognizing unit 102c includes an edge detecting unit 102d, a dividing unit 102e, and a deskew/cropping unit 102f in terms of a functional concept.

The edge detecting unit 102d detects edge coordinates of a document image closest to an outer edge of the read image in a plurality of certain directions. The edge detecting unit 102d may detect, in the new read image, edge coordinates of a document image closest to an outer edge of a divided region in a certain direction. Alternatively, the edge detecting unit 102d may detect edge coordinates of a specific edge (e.g., any one or both of the upper edge and the left edge) of the document image closest to the outer edge of the read image in a plurality of certain directions (e.g., any one or both of a horizontal direction and a vertical direction).

The dividing unit 102e regionally divides the read image in a certain direction. The dividing unit 102e may regionally divide the read image in a certain direction based on any one or both of a region of the read image in which no edge coordinates are detected by the edge detecting unit 102d and edge coordinates of an edge end of the document image detected by the edge detecting unit 102d. The dividing unit 102e may regionally divide the read image by detecting an intersecting position of coordinate groups in a certain direction, the coordinate groups passing through any one or both of the region of the read image in which no edge coordinates are detected by the edge detecting unit 102d and the edge end of the document image detected by the edge detecting unit 102d. Alternatively, the dividing unit 102e may regionally divide the read image in a certain direction based on any one or both of the region of the read image in which no edge coordinates are detected by the edge detecting unit 102d and, of the edge coordinates of the document image detected by the edge detecting unit 102d, coordinates in which a discontinuous change is detected. The dividing unit 102e may store the divided region in the storage unit 106.

The deskew/cropping unit 102f performs any one or both of deskew and cropping to the document image. The deskew/cropping unit 102f may perform any one or both of the following: deskewing the document image contained in the divided region regionally divided by the dividing unit 102e; and cropping the document image contained in the divided region regionally divided by the dividing unit 102e from the divided region. The deskew/cropping unit 102f may store the document image in the storage unit 106.

The missing-image determining unit 102g determines (detects) a missing image (missing sheet). The missing-image determining unit 102g may determine a missing image when the sheet sensor detecting unit 114 detects a document at the conveying inlet. For example, the missing-image determining unit 102g may determine that an unread document is present when the sheet sensor detecting unit 114 detects a document at the conveying inlet. The missing-image determining unit 102g may determine a missing image as a result of the conveying error when the sheet sensor detecting unit 114 detects a document conveying error. The missing-image determining unit 102g includes the document jut detecting unit 102h in terms of the functional concept.

The document jut detecting unit 102h detects a document jut when edge coordinates of the document image are on the outer edge of the read image. That is, the document jut detecting unit 102h may determine whether the sheet (document) is present at the trailing end of a read image.

The image message displaying unit 102i outputs any one or both of an image and a message. The image message displaying unit 102i may output an alarm message associated with the document jut when the document jut detecting unit 102h detects a document jut. The image message displaying unit 102i may output an alarm message associated with the missing image when the missing-image determining unit 102g determines a missing image. The image message displaying unit 102i may output an alarm message associated with the conveying error when the sheet sensor detecting unit 114 detects a document conveying error. The image message displaying unit 102i may output an alarm message associated with the conveying error when the missing-image determining unit 102g determines a missing image as a result of a document conveying error. The image message displaying unit 102i may output (display or produce a sound output of, or do both) any one or both of an image (e.g., a read image, a divided region, a document image, or a message image) and a message via the input/output unit 112.

2. Process According to the Embodiment

Figure 2:
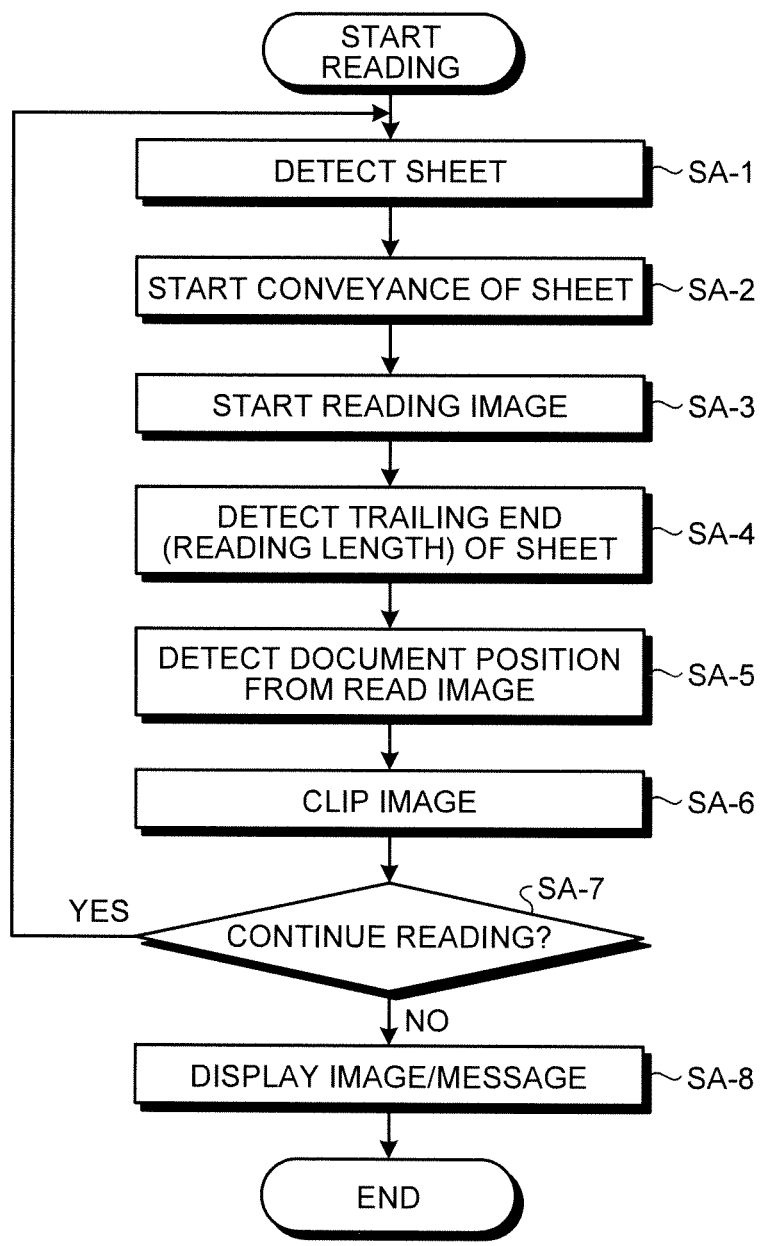
FIG. 2 is a flowchart of an example of processing performed by an image-reading apparatus according to an embodiment.

An exemplary process performed by the image-reading apparatus 100 configured as described above will be explained below with reference to FIGS. 2 to 23. FIG. 2 is a flowchart of the exemplary process performed by the image-reading apparatus 100 according to the embodiment.

As shown in FIG. 2, the sheet sensor detecting unit 114 determines that a sheet (document) is inserted in the conveying inlet or present on the conveying path (Step SA-1).

The sheet conveying unit 116 starts conveyance of the sheet (document) (Step SA-2).

The image acquiring unit 102b causes the image-reading unit 110 to start reading images of one or more sheets (documents) (Step SA-3).

The reading length detecting unit 102a detects a sheet trailing end (reading length) based on the reading state of the sheet (document) detected by the sheet sensor detecting unit

114. The image acquiring unit 102b acquires a read image of the reading length detected by the reading length detecting unit 102a (Step SA-4).

The document-position recognizing unit 102c detects the document position from the read image acquired by the image acquiring unit 102b (Step SA-5).

The document-position recognizing unit 102c clips a document image from the read image (Step SA-6).

Figure 3:
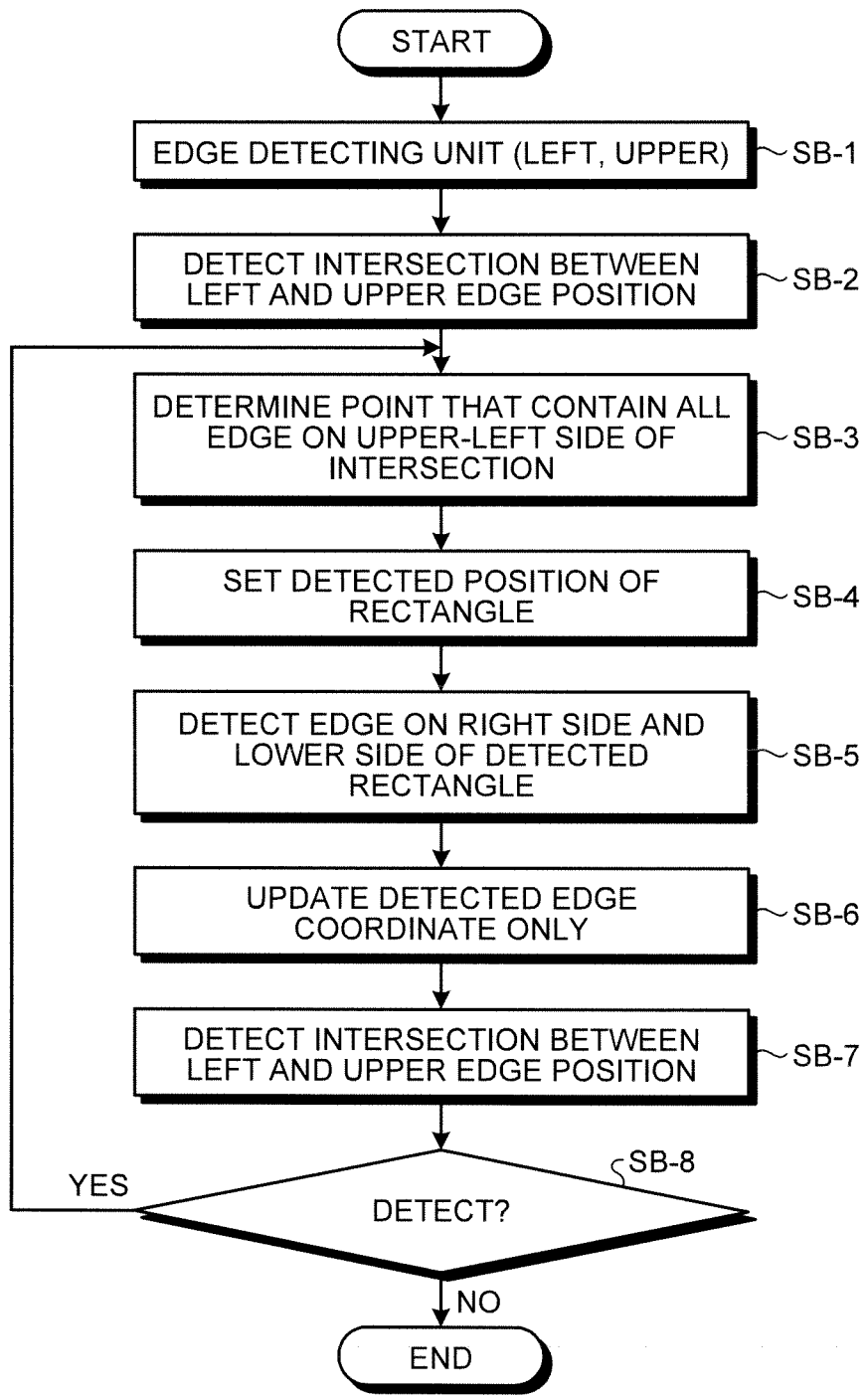
FIG. 3 is a flowchart of an exemplary document-position recognizing process according to the embodiment.

An exemplary document-position recognizing process (multiple-region detecting algorithm) according to the embodiment will be explained with reference to FIGS. 3 to 9. FIG. 3 is a flowchart of the exemplary document-position recognizing process according to the embodiment. FIGS. 4 to 9 are diagrams of the exemplary document-position recognizing process according to the embodiment.

As shown in FIG. 3, the edge detecting unit 102d detects edge coordinates of a document image closest to the outer edge of the read image in the rightward (horizontal) direction from the left outline of the read image and in the downward (vertical) direction from the upper outline of the read image (Step SB-1).

Figure 4:
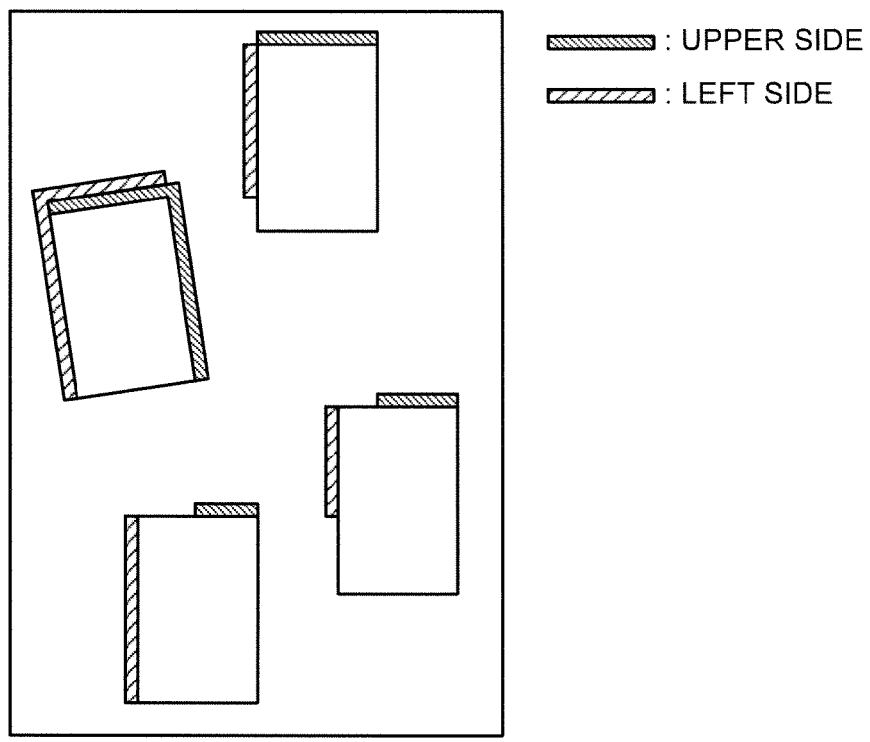
FIG. 4 is a diagram of an exemplary document-position recognizing process according to the embodiment.

For example, as shown in FIG. 4, according to the embodiment, edge detection may be performed from the left side and upper side of the read image.

With reference back to FIG. 3, the dividing unit 102e detects an intersection between the left and upper edge positions (an intersection between a coordinate group (straight line) in the rightward (horizontal) direction from the left outline of the read image and a coordinate group (straight line) in the downward (vertical) direction from the upper outline of the read image, the coordinate groups (straight lines) passing through any one or both of the region of the read image in which no edge coordinates are detected by the edge detecting unit 102d and the edge end of the document image detected by the edge detecting unit 102d) (Step SB-2).

Figure 5:
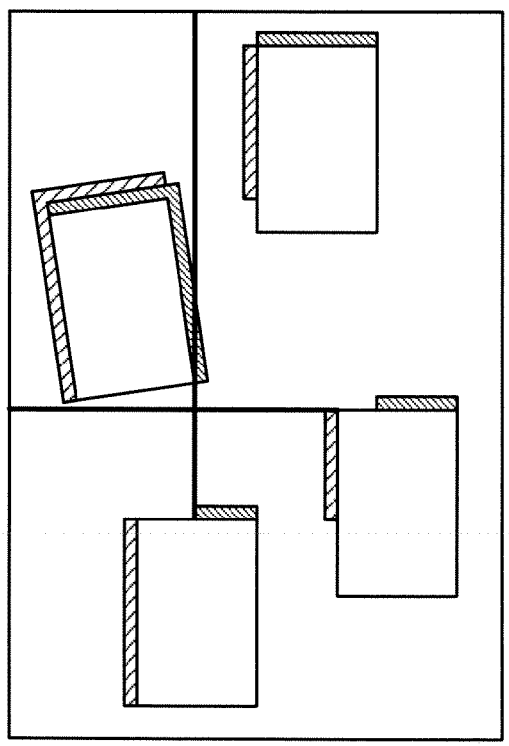
FIG. 5 is a diagram of an exemplary document-position recognizing process according to the embodiment.

For example, as shown in FIG. 5, according to the embodiment, an intersecting position may be detected between the edge detection from the left side and the edge detection from the upper side.

With reference back to FIG. 3, the dividing unit 102e determines points that contain all edges on the upper-left side of the intersection (a divided region containing the document image on the upper-left side of the intersection) (Step SB-3).

The dividing unit 102e then sets (regionally divides) a detected position (divided region) of a rectangle (Step SB-4). Furthermore, the deskew/cropping unit 102f may perform any one or both of the following: deskewing the document image contained in the divided region regionally divided by the dividing unit 102e; and cropping the document image contained in the divided region regionally divided by the dividing unit 102e from the divided region.

Figure 6:
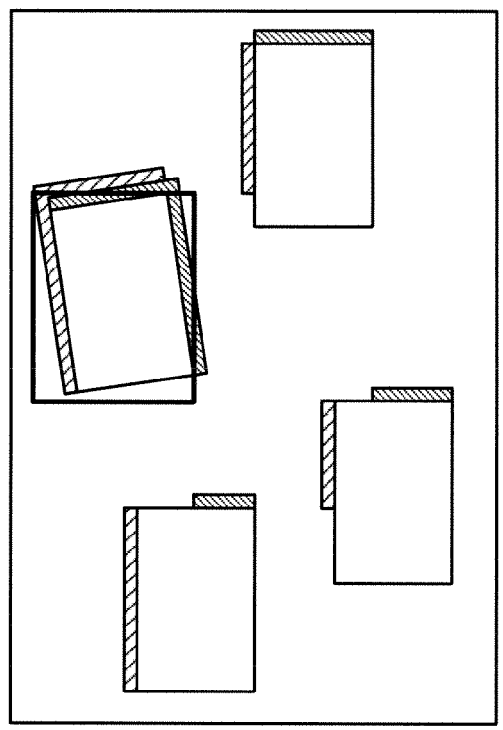
FIG. 6 is a diagram of an exemplary document-position recognizing process according to the embodiment.

For example, as shown in FIG. 6, according to the embodiment, a rectangle may be defined by finding an edge position on the upper-left side of the intersecting position. Specifically, according to the embodiment, edge detection may be performed on the read image in two (vertical and horizontal) directions, a combination of edge coordinates may be obtained so that the coordinates in which no edges can be detected or position coordinates in which edges are detected in the two directions cross each other, and the resultant region may be divided.

With reference back to FIG. 3, the edge detecting unit 102d detects edges on the right side and lower side of the detected position (divided region) of the detected rectangle (edge coordinates of the document image closest to the outer edge of the divided region, in the rightward (horizontal) direction from the right outline of the divided region and in the downward (vertical) direction from the lower outline of the divided region in a new read image that is the read image excluding the divided region) (Step SB-5).

Figure 7:
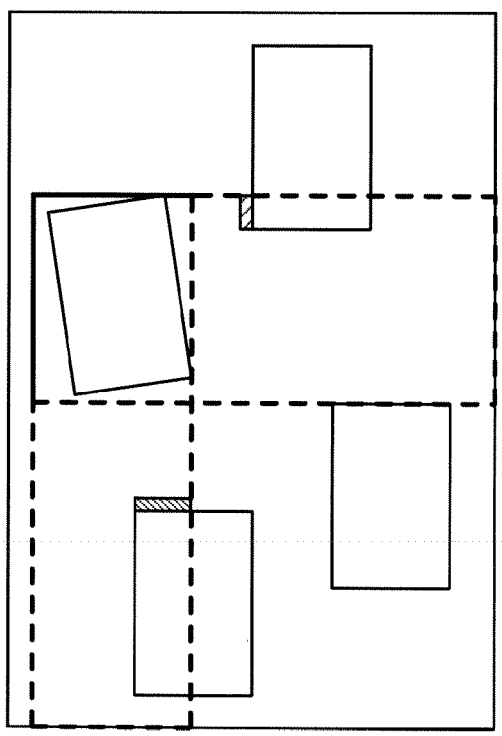
FIG. 7 is a diagram of an exemplary document-position recognizing process according to the embodiment.

For example, as shown in FIG. 7, according to the embodiment, edge detection may be performed again for the right side of the detected rectangle from the left and the lower side of the detected rectangle from the top.

With reference back to FIG. 3, the edge detecting unit 102d updates only the edge coordinates detected at Step SB-5 (by adding the edge coordinates detected at Step SB-5 to the edge coordinates detected at Step SB-1 to update the detected edge coordinates) (Step SB-6).

Figure 8:
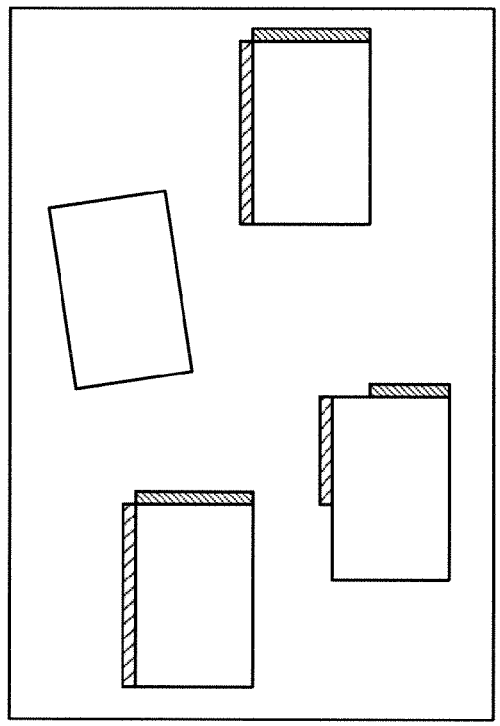
FIG. 8 is a diagram of an exemplary document-position recognizing process according to the embodiment.

For example, as shown in FIG. 8, according to the embodiment, only the detected edge coordinates may be updated.

With reference back to FIG. 3, the dividing unit 102e detects an intersection between the left and upper edge positions (an intersection between a coordinate group (straight line) in the rightward (horizontal) direction from the left outline of the new read image and a coordinate group (straight line) in the downward (vertical) direction from the upper outline of the read image, the coordinate groups (straight lines) passing through any one or both of the region of the new read image in which no edge coordinates are detected by the edge detecting unit 102d and the edge end of the document image detected by the edge detecting unit 102d) (Step SB-7).

Figure 9:
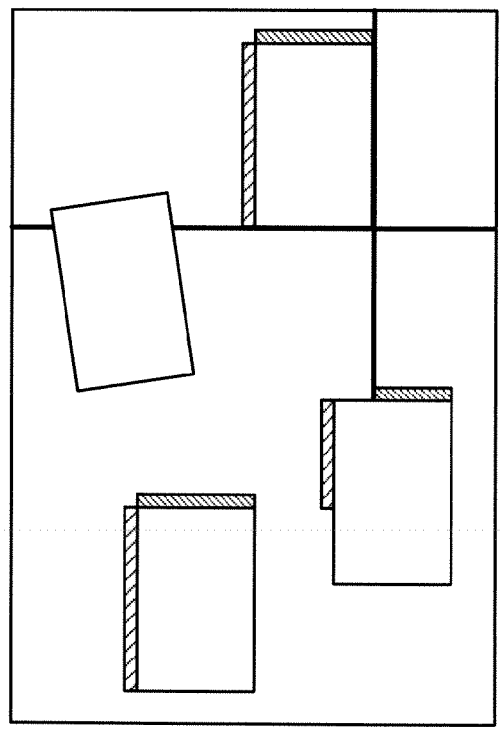
FIG. 9 is a diagram of an exemplary document-position recognizing process according to the embodiment.

For example, as shown in FIG. 9, according to the embodiment, an intersecting position may be detected between the edge detection from the left side and the edge detection from the upper side. Specifically, according to the embodiment, a document region may be detected by obtaining rectangle information (upper-right and lower-left) relative to the divided region. Edge detection may be performed in two (vertical and horizontal) directions of the document region in this manner to update the edge coordinate position again. A combination of edge coordinates may be obtain so that the position coordinates in which edges are detected in the two directions cross each other, and the resultant region may then be divided. This procedure may be repeated to divide the region. According to the embodiment, edge detection may be performed in two or more directions.

With reference back to FIG. 3, the dividing unit 102e determines whether a divided region containing the document image on the upper-left side of the intersection is detected (Step SB-8).

When the dividing unit 102e determines that a divided region containing the document image on the upper-left side of the intersection is detected (Yes at Step SB-8), the process is shifted to Step SB-3. According to the embodiment, these steps are repeated until a rectangle can no longer be detected or edges are no longer found.

When the dividing unit 102e determines that no divided region containing the document image on the upper-left side of the intersection is detected (No at Step SB-8), the process is terminated. As described above, use of the technique according to the embodiment enables reading images through the edge detection simply from the left and upper sides. As a result, edge detection and clipping a document image can be performed while reading the image, and unlimited reading can be performed by re-using an unnecessary image memory after clipping the document image as an image reading memory.

According to the embodiment, edges are detected from the left side and upper side of the read image. Edges may nonetheless be detected either from the right side and upper side, from the lower side and left side, or from the lower side and right side. Additionally, in the embodiment, calculation for detecting a plurality of regions may be performed through simple edge detection and position comparison. According to the embodiment, a memory required for detecting the multiple-regions needs to store position coordinates in which edges are detected.

The exemplary document-position recognizing process (multiple-region detecting algorithm) according to the embodiment will further be explained with reference to FIGS. 10 to 18. FIGS. 10 to 18 are diagrams of the exemplary document-position recognizing process according to the embodiment.

Figure 10:
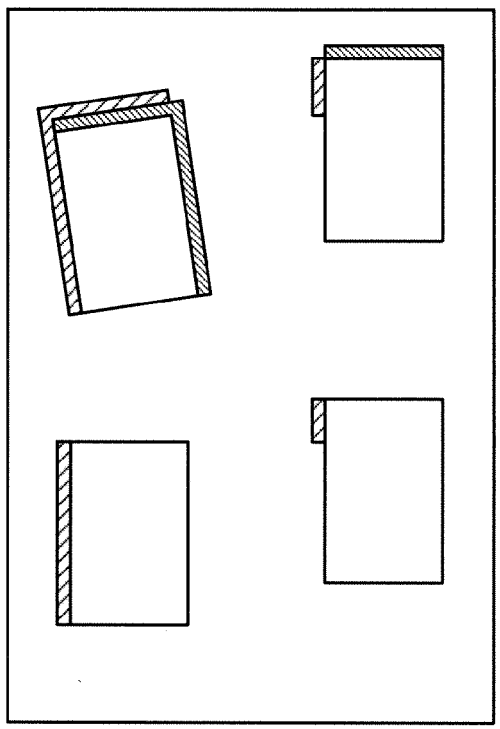
FIG. 10 is a diagram of an exemplary document-position recognizing process according to the embodiment.
Figure 11:
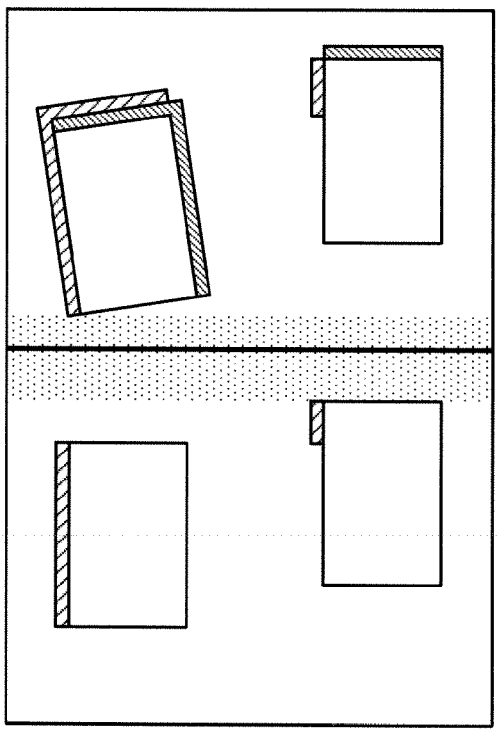
FIG. 11 is a diagram of an exemplary document-position recognizing process according to the embodiment.
Figure 12:
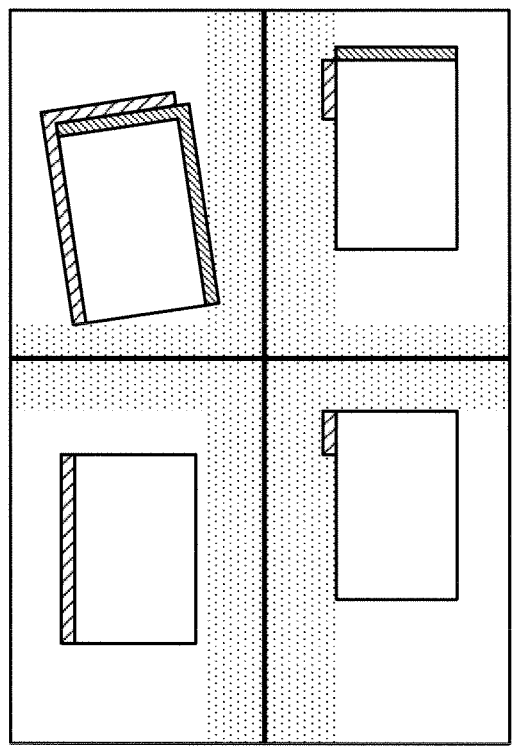
FIG. 12 is a diagram of an exemplary document-position recognizing process according to the embodiment.

As shown in FIGS. 10 to 12, according to the embodiment, the read image may be regionally divided as follows: performing edge detection from the left side and upper side of the read image (FIG. 10); segmenting (dividing) the read image at a position (region) in which edge no coordinates are detected by the edge detection from the left side (FIG. 11); and segmenting (dividing) the read image at a position (region) in which no edge coordinates are detected by the edge detection from the upper side (FIG. 12). That is, the read image may be regionally divided at portions in which no edges can be detected.

Figure 13:
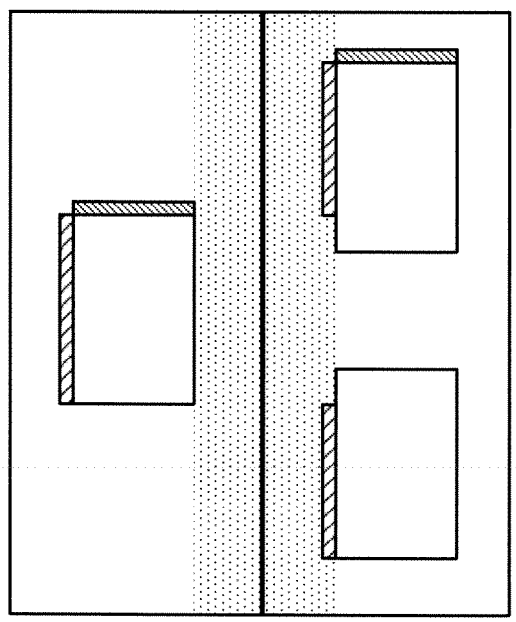
FIG. 13 is a diagram of an exemplary document-position recognizing process according to the embodiment.
Figure 14:
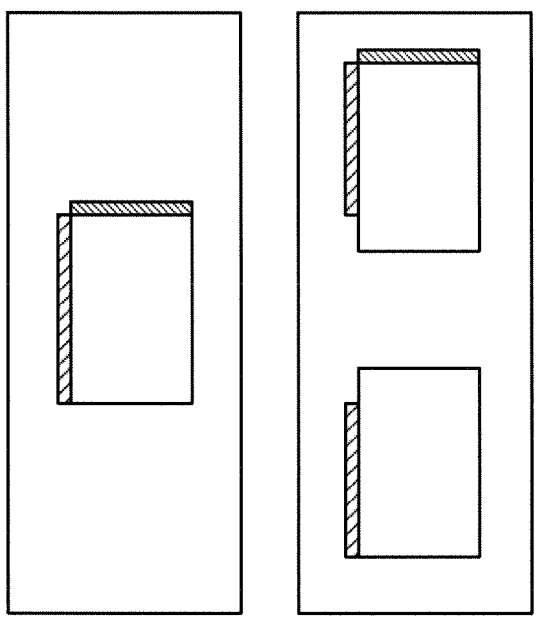
FIG. 14 is a diagram of an exemplary document-position recognizing process according to the embodiment.
Figure 15:
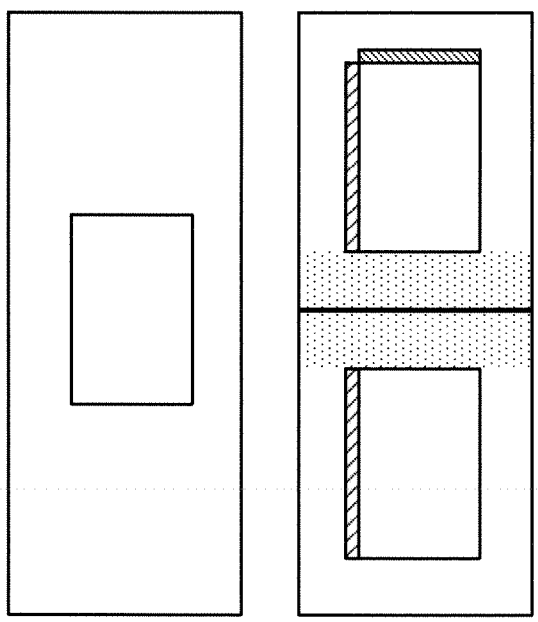
FIG. 15 is a diagram of an exemplary document-position recognizing process according to the embodiment.

As shown in FIGS. 13 to 15, according to the embodiment, the read image may be regionally divided as follows: performing edge detection from the left side and upper side of the read image (FIG. 13); when the read image can be regionally divided crosswise (into the left side and right side), regionally dividing (separating) the read image crosswise at a region in which no edge coordinates are detected by the edge detection from the upper side (FIG. 14); performing edge detection from the left side and upper side of the divided region; and when the read image can be regionally divided lengthwise (into the upper side and lower side), regionally dividing (separating) the divided region lengthwise at a region in which no edge coordinates are detected by the edge detection from the left side (FIG. 15). That is, the read image may be regionally divided at portions in which no edges can be detected; and the edge detection may further be performed in the divided region to divide the divided region at a portion in which no edges can be detected.

Figure 16:
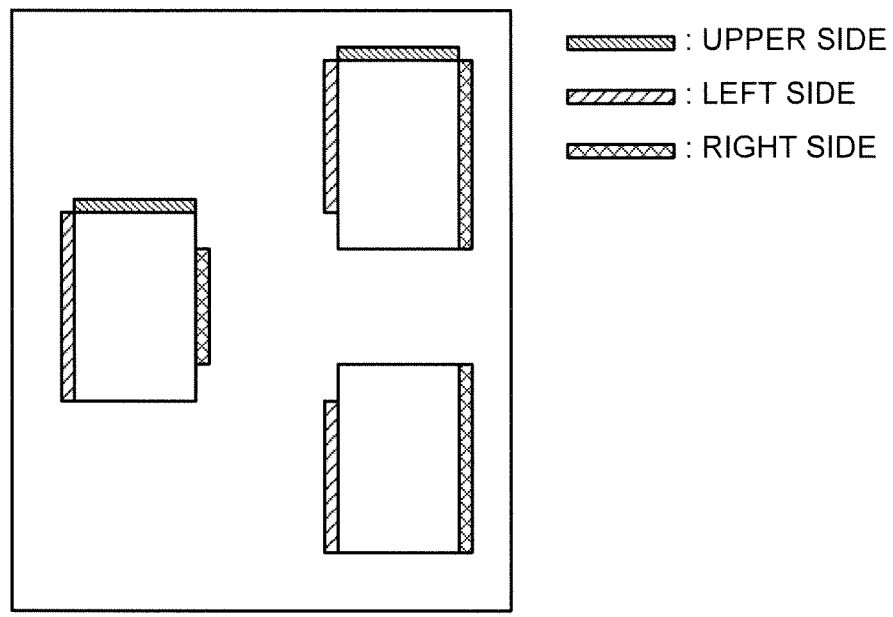
FIG. 16 is a diagram of an exemplary document-position recognizing process according to the embodiment.
Figure 17:
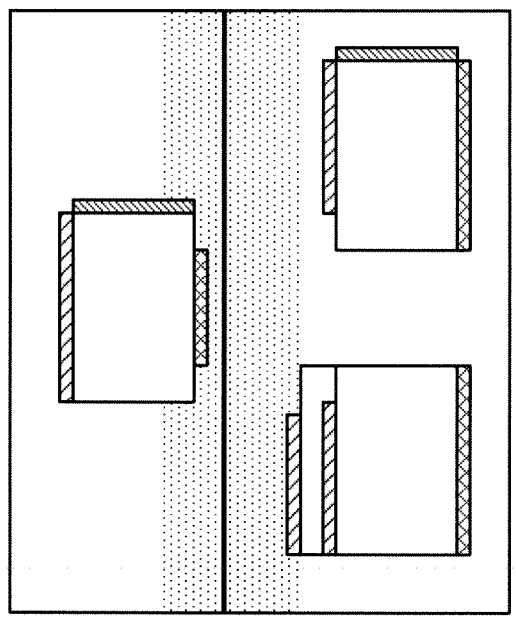
FIG. 17 is a diagram of an exemplary document-position recognizing process according to the embodiment.
Figure 18:
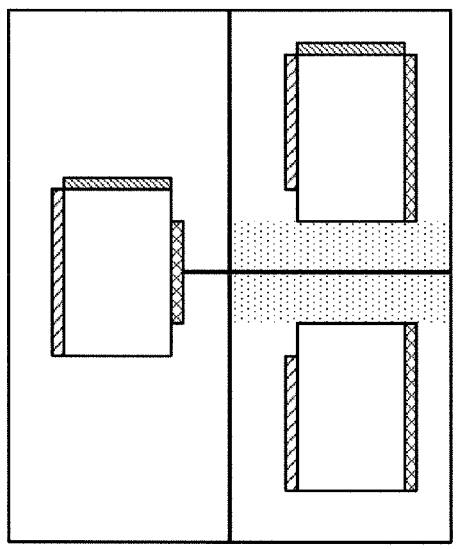
FIG. 18 is a diagram of an exemplary document-position recognizing process according to the embodiment.

As shown in FIGS. 16 to 18, according to the embodiment, the read image may be regionally divided as follows: performing edge detection from the left side, right side, and upper side of the read image (FIG. 16); when the read image can be regionally divided crosswise (into the left side and right side), regionally dividing (separating) the read image crosswise at a region in which no edge coordinates are detected by the edge detection from the upper side (FIG. 17); and when the read image can be regionally divided lengthwise (into the upper side and lower side), regionally dividing (separating) the divided region lengthwise at a region in which no edge coordinates are detected by the edge detection from the right side (FIG. 18). That is, the read image may be regionally divided through edge detection from three directions.

With reference back to FIG. 2, the control unit 102 determines whether to continue reading based on the determination on a missing image by the missing-image determining unit 102g (Step SA-7).

When the control unit 102 determines that reading is to be continued (Yes at Step SA-7), the process is shifted to step SA-1.

Figure 19:
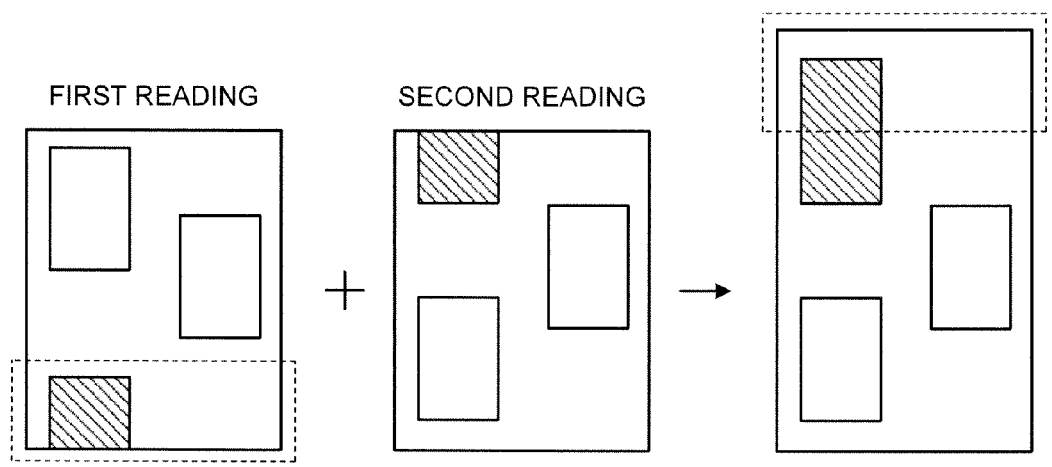
FIG. 19 is a diagram of an exemplary process that removes a limit on the reading length according to the embodiment.

An exemplary process that removes a limit on the reading length according to the embodiment will be explained below with reference to FIG. 19. FIG. 19 is a diagram of the exemplary process that removes a limit on the reading length according to the embodiment.

As shown in FIG. 19, according to the embodiment, when edge coordinates of the document image in a read image in a first reading are located on the outer edge of the read image, an end region (the region enclosed by the dotted line in the figure) of the read image that contains the document image including the edge coordinates on the outer edge may be spliced with a read image acquired next (a read image in a second reading) to acquire a new read image (image synthesis). That is, when a document edge is located at the trailing end of the read image, that part is spliced with the next read image.

As explained above, unlimited reading can be achieved by detecting the document position simultaneously with image reading. In the read image in the first reading, the region excluding the end region is regionally divided through the document-position recognizing process, and the document image is thereby acquired. That is, according to the embodiment, any portion is clipped other than the image having no missing sheet in the read image in the first reading; thereafter, synthesis with the read image in the second reading is performed; and document detection is performed again. According to the embodiment, therefore, when an error occurs, the document image having read before the occurrence of the error is normally output, and only the image with missing sheet is spliced. This enables unlimited reading. The presence of a missing image may be determined on the read document when the document edge is located at the lower end of the image, or based on the state of the read image and the state of the sheet sensor (the sheet conveying state).

With reference back to FIG. 2, when the control unit 102 determines not to continue reading (No at Step SA-7), the image message displaying unit 102i displays any one or both of an image and a message via the input/output unit 112 (Step SA-8), and the process is then terminated. The image message displaying unit 102i may display the document image via the input/output unit 112 when the missing-image determining unit 102g determines that no missing image is present (that is, reading is normally terminated).

Figure 20:
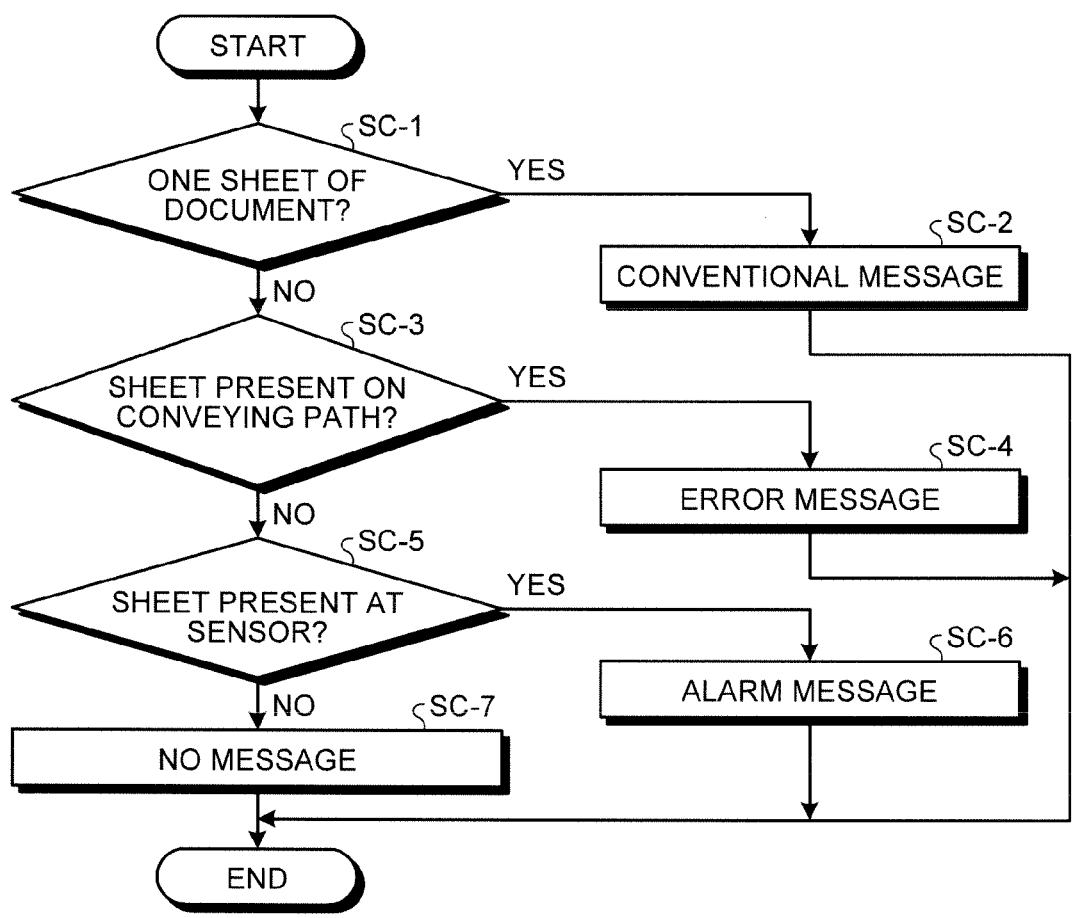
FIG. 20 is a flowchart of an exemplary process of displaying a message according to the embodiment.
Figure 21:
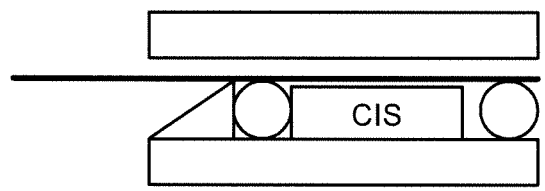
FIG. 21 is a diagram of an exemplary reading state according to the embodiment.
Figure 21:
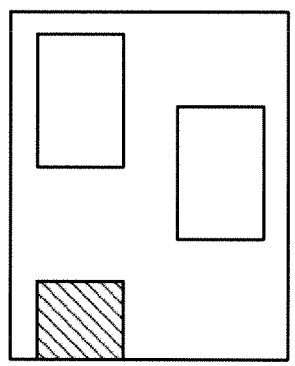
Figure 22:
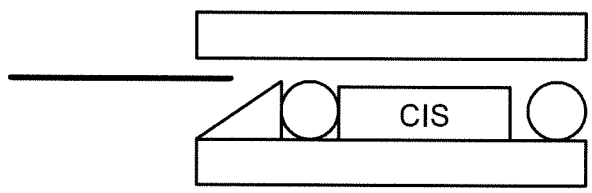
FIG. 22 is a diagram of an exemplary reading state according to the embodiment.
Figure 22:
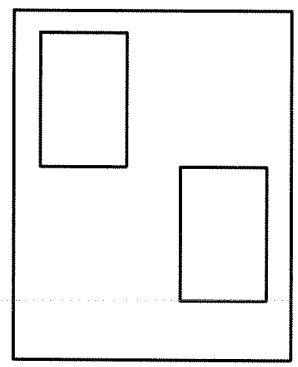
Figure 23:
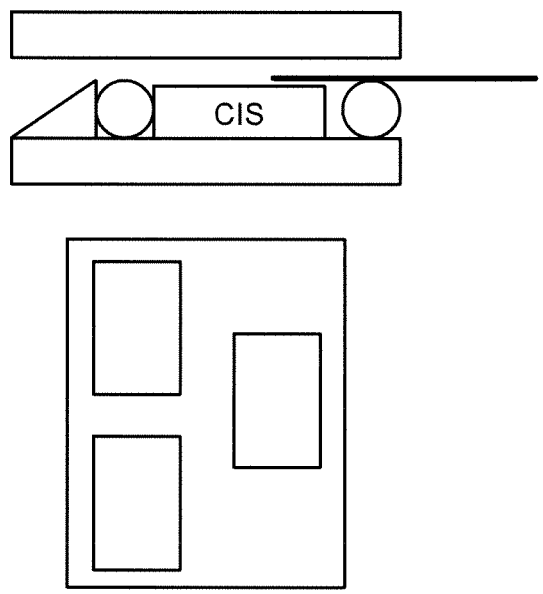
FIG. 23 is a diagram of an exemplary reading state according to the embodiment.

An exemplary process of displaying a message according to the embodiment will be explained below with reference to FIGS. 20 to 23. FIG. 20 is a flowchart of the exemplary process of displaying a message according to the embodiment. FIGS. 21 to 23 are diagrams of exemplary reading states according to the embodiment.

As shown in FIG. 20, the control unit 102 determines whether the document (the document image of the read image having the reading length (maximum reading length) acquired by the image acquiring unit 102b) is one sheet, based on the reading state of the document detected by the sheet sensor detecting unit 114 (Step SC-1).

When the control unit 102 determines that the document is one sheet (Yes at Step SC-1), the image message displaying unit 102i displays a conventional message in the input/output unit 112 (Step SC-2), and the process is terminated. For example, when the reading is completed to the end, the image message displaying unit 102i may opt not to display any message. When an error occurs, the image message displaying unit 102i may display an error message.

When the control unit 102 determines that the document is not one sheet (No at Step SC-1), the sheet sensor detecting unit 114 detects a sheet (document) when it is present on the conveying path (Step SC-3).

When the sheet sensor detecting unit 114 detects a sheet (document) on the conveying path (Yes at Step SC-3), the image message displaying unit 102i displays an error message in the input/output unit 112 (Step SC-4), and the process is terminated.

For example, as shown in FIG. 21, when a document is left midway on the conveying path and re-reading is necessary (abnormal image processing with the sensor in an activated state), the image message displaying unit 102$i$ may display an error message in the input/output unit 112.

With reference back to FIG. 20, when the sheet sensor detecting unit 114 detects no sheet (document) on the conveying path (No at Step SC-3), the sheet sensor detecting unit 114 detects a sheet (document) when it is present at the conveying inlet (Step SC-5).

When the sheet sensor detecting unit 114 detects a sheet (document) at the conveying inlet (Yes at Step SC-5), the image message displaying unit 102$i$ displays an alarm message in the input/output unit 112 (Step SC-6), and the process is terminated.

For example, as shown in FIG. 22, when a document is left at the conveying inlet and next reading is necessary (normal image processing with the sensor in an activated state) after the end of a continuous scanning, the image message displaying unit 102$i$ may display an alarm message in the input/output unit 112.

With reference back to FIG. 20, when the sheet sensor detecting unit 114 detects no sheet (document) at the conveying inlet (No at Step SC-5), the image message displaying unit 102$i$ does not cause the message to be displayed (Step SC-7), and the process is terminated.

For example, as shown in FIG. 23, when the document is read to the end with the maximum reading length reached (normal condition), the image message displaying unit 102$i$ may opt not to display a message (no messages). The kind of messages as a notification to the user may be changed according to the state of a sheet detecting sensor (sheet sensor detecting unit 114) and the state of the image-reading unit 110 when the maximum reading length is reached. Changing messages allows the user to determine easily whether re-reading can be performed.

As explained heretofore, according to the embodiment, when scanning a plurality of pieces of media, such as business cards, receipts, and postcards, a document scanner device automatically detects the position of the documents. Inserting a plurality of sheets simultaneously, rather than scanning the documents one by one, can reduce scanning time. When an error occurs, the known techniques discard all read images. In contrast, according to the embodiment, the documents that have successfully been read can be output even with an error occurring.

Thus, according to the embodiment, the sheets that have been read do not require re-scanning. According to the embodiment, the reading length can be unlimited. This enables reading with no limit on the reading length. According to the embodiment, messages can be changed according to the sheet conveying state. According to the embodiment, an appropriate message is displayed when the reading length reaches its maximum. This permits even easier use on the part of the user.

According to the embodiment, when a plurality of documents are simultaneously read with the document scanner, the position of the documents can be efficiently detected, and the image can be output even when the reading length is large, so that the image length imposes no restrictions. According to the embodiment, even a large reading length due to the orientation of the document inserted by the user does not theoretically require a lot of memory or an increased amount of calculation. This enables implementation on hardware that does not have enhanced specifications or is of high cost. Additionally, according to the embodiment, the document image can be output without being restricted by the reading length (image length), although the reading length (image length) can become endlessly long depending on how documents are read or inserted.

According to the embodiment, the document image can be output without feature quantities of the entire surface of the read image. This enables the document image to be output even without detecting the position of each of documents contained up to the trailing end of the image length to clip each of the documents. According to the embodiment, a message can be given to the user to prompt him or her to perform the operation again also at the trailing end of the image or when a jam and other errors occur, depending on the sheet conveying state. Additionally, according to the embodiment, even when a jam or other errors occur, part (document image) of the read image on which the error has occurred can be output.

3. Other Embodiments

The present invention has been explained with reference to a certain embodiment. However, the present invention may be embodied in various embodiments without departing from the spirit and scope of the invention.

For example, the image-reading apparatus 100 may perform processing in a standalone manner. The image-reading apparatus 100 may perform processing in response to a request from a client terminal (separate from the image-reading apparatus 100) and return a result of the processing to the client terminal.

Among the pieces of processing explained in the embodiment, all or part of the processing to be performed automatically may be performed manually, or all or part of the processing to be performed manually may be performed automatically by a known method.

Any desirable modification can be made in the processing procedures, control procedures, specific names, information including registry data or parameters, such as retrieval conditions, for processing, screen examples, or database configurations described in this specification and the accompanying drawings, unless otherwise specified.

Each of the elements of the image-reading apparatus 100 shown in the drawings is merely functionally conceptual and does not necessarily have to be physically configured as shown the drawings.

For example, processing functions that each of the units constituting the image-reading apparatus 100 has, in particular, each of the processing functions performed by the control unit 102, may be achieved in all or in any desired part thereof by the central processing unit (CPU) and a computer program interpreted and performed by the CPU, or may be achieved as hardware by wired logic. Such a computer program is recorded in a non-transitory, computer-readable recording medium, including programmed instructions that cause a computer to execute a method according to the present invention as will be described later, and is mechanically loaded as necessary by the image-reading apparatus 100. Specifically, the storage unit 106 such as a ROM or a hard disk drive (HDD) records a computer program for giving instructions to the CPU in cooperation with an operating system (OS) and performing various kinds of processing. Such a computer program is executed by being loaded in a RAM and cooperates with the CPU to constitute the control unit.

The computer program may be stored in an application program server connected via any network to the image-reading apparatus 100 and can thus be downloaded in all or in any part thereof as necessary.

The computer program according to the present invention may be stored in a computer-readable recording medium, or may be structured as a program product. Examples of the "recording medium" include any "portable physical medium" such as a memory card, a USB memory, an SD card, a flexible disk, a magnetic optical disk, a ROM, an EPROM, an EEPROM, a CD-ROM, an MO, a DVD, and a Blu-ray (registered trademark) disc.

The "computer program" refers to a data processing method written in any language and according to any description method and can have source codes and binary codes in any format. The "computer program" is not limited to a single configuration, but includes a distributed configuration including a plurality of modules or libraries and a configuration that cooperates with another independent program represented by an operating system (OS) to achieve its functions. Any known configuration or procedure may be used for a specific configuration and loading procedure to read the recording medium, or an installation procedure following the loading in each unit described in the embodiment.

Various types of databases stored in the storage unit 106 are storage units including a memory device such as a RAM or a ROM, a fixed disk device such as a hard disk, a flexible disk, and an optical disc, and may store various types of programs, tables, databases, and web page files used in various processing or providing web sites.

The image-reading apparatus 100 may be configured as an information processing apparatus such as a known personal computer and workstation. The information processing apparatus may be connected with any peripheral device. The image-reading apparatus 100 may be achieved by implementing software (including a computer program and data) that causes the information processing apparatus to perform the method according to the present invention.

The specific configuration of distribution or integration of the units is not limited to the configuration as shown in the drawings. The units as a whole or in part can be functionally or physically distributed or integrated in any unit according to various attachments for example or depending on functional load. That is, the embodiments explained above may be combined with each other or selectively embodied.

The present invention enables a plurality of document regions to be detected from a read image using a method that achieves high memory efficiency and requires a small amount of calculation.

The present invention provides the image-reading apparatus, the image-processing method, and the computer program product capable of simultaneously reading plural documents effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-reading apparatus comprising:
    a camera configured to scan one or more documents;
    a control unit configured to:
        cause the camera to scan one or more documents to acquire a read image;
        detect edge coordinates of a document image closest to an outer edge of the read image in a plurality of certain directions; and
        regionally divide the read image in the certain directions based on any one or both of a region of the read image in which no edge coordinates are detected and the edge coordinates of an edge end of the document image,
        wherein when the document image is contained in a divided region regionally divided by the control unit, the control unit acquires the read image excluding the divided region as a new read image and detects edge coordinates of a document image closest to the outer edge of the divided region in a plurality of certain directions in the new read image;
    a sheet sensor configured to detect a reading state of the document,
    wherein the control unit is configured to cause the camera to read one or more documents and acquire the read image when the sheet sensor detects that no document is present at a conveying inlet, and
    wherein the control unit is further configured to determine a missing image when the sheet sensor detects the document at the conveying inlet.

2. The image-reading apparatus according to claim 1, wherein the control unit is configured to regionally divide the read image by detecting an intersecting position of coordinate groups in the certain directions, the coordinate groups passing through any one or both of the region of the read image in which no edge coordinates are detected and the edge end of the document image.

3. The image-reading apparatus according to claim 1, wherein the control unit is further configured to:
    detect a document jut when the edge coordinates of the document image are on the outer edge of the read image.

4. The image-reading apparatus according to claim 3, wherein the control unit is further configured to:
    output an alarm message associated with the document jut when the control unit detects the document jut.

5. The image-reading apparatus according to claim 1, wherein the control unit is further configured to:
    output an alarm message associated with the missing image when the control unit determines the missing image.

6. The image-reading apparatus according to claim 1, wherein the control unit is further configured to:
    when the sheet sensor detects a conveying error of the document, output an alarm message associated with the conveying error.

7. The image-reading apparatus according to claim 3, wherein when the control unit detects the document jut, the control unit splices an end region of the read image that contains the document image including the edge coordinates on the outer edge and the read image acquired next by the control unit, to acquire a new read image.

8. The image-reading apparatus according to claim 1, wherein the control unit is further configured to:
    perform any one or both of the following: deskewing the document image contained in the divided region regionally divided by the control unit; and cropping the document image contained in the divided region regionally divided by the control unit from the divided region.

9. An image-processing method by an image-reading apparatus comprising:
    a first image acquiring step of causing a camera to read one or more documents to acquire is read image when a sheet sensor detects that no document is present at a conveying inlet
    a missing image determining step of determining a missing image when the sheet sensor detects the document at the conveying inlet
    a first edge detecting step of detecting edge coordinates of a document image closest to an outer edge of the read image in a plurality of certain directions;

a dividing step of regionally dividing the read image in the certain directions based on any one or both of a region of the read image in which no edge coordinates are detected at the edge detecting step and the edge coordinates of an edge end of the document image detected at the edge detecting step;

a second image acquiring step of, when the document image is contained in a divided region regionally divided in the dividing step, acquiring the read image excluding the divided region as a new read image;

a second edge detecting step of detecting edge coordinates of a document image closest to the outer edge of the divided region in a plurality of certain directions in the new read image.

10. A computer program product having a non-transitory tangible computer readable medium including programmed instructions for causing, when executed by an image-reading apparatus, the image-reading apparatus to perform an image-processing method comprising:

a first image acquiring step of causing a camera to read one or more documents to acquire a read image when a sheet sensor detects that no document is present at a conveying inlet;

a missing image determining step of determining a missing image when the sheet sensor detects the document at the conveying inlet a first edge detecting step of detecting edge coordinates of a document image closest to an outer edge of the read image in a plurality of certain directions; and a dividing step of regionally dividing the read image in the certain directions based on any one or both of a region of the read image in which no edge coordinates are detected at the edge detecting step and the edge coordinates of an edge end of the document image detected at the edge detecting step;

a second image acquiring step of, when the document image is contained in a divided region regionally divided in the dividing step, acquiring the read image excluding the divided region as a new read image; and a second edge detecting step of detecting edge coordinates of a document image closest to the outer edge of the divided region in a plurality of certain directions in the new read image.

* * * * *